United States Patent [19]
Depoix

[11] 3,840,406
[45] Oct. 8, 1974

[54] ALKALINE CELL WITH GELLED ELECTROLYTE AND RUPTURABLE MEANS

[75] Inventor: Pierre Depoix, Poitiers, France

[73] Assignee: Saft-Societe des Accumulateurs Fixes et de Traction, Romainville, France

[22] Filed: June 30, 1972

[21] Appl. No.: 268,015

[30] Foreign Application Priority Data
June 30, 1971 France .............................. 71.24029

[52] U.S. Cl............................................. 136/86 A
[58] Field of Search........................... 136/86 A, 157

[56] References Cited
UNITED STATES PATENTS

| | | | |
|---|---|---|---|
| 1,481,178 | 1/1924 | Benner et al. ...................... | 136/157 |
| 2,748,183 | 5/1956 | Morehouse ........................ | 136/157 |
| 2,938,064 | 5/1960 | Kordesch .......................... | 136/86 A |
| 3,019,141 | 1/1962 | Priebe ................................ | 136/157 |
| 3,697,326 | 10/1972 | Jammet ............................. | 136/86 A |

Primary Examiner—Winston A. Douglas
Assistant Examiner—H. A. Feeley
Attorney, Agent, or Firm—Kenyon & Kenyon Reilly Carr & Chapin

[57] ABSTRACT

Alkaline electrolyte cell depolarized by oxygen, in which a positive electrode supplied with oxygen or with air or other oxygen containing gas is separated from a negative electrode containing powdered zinc by a layer of gelled electrolyte, and comprising free expansion space. The gelled electrolyte layer is enlarged so as to separate the active negative material from the said free space. The expansion of the active negative mass during discharge can, in this way, be controlled.

15 Claims, 1 Drawing Figure

PATENTED OCT 8 1974  3,840,406
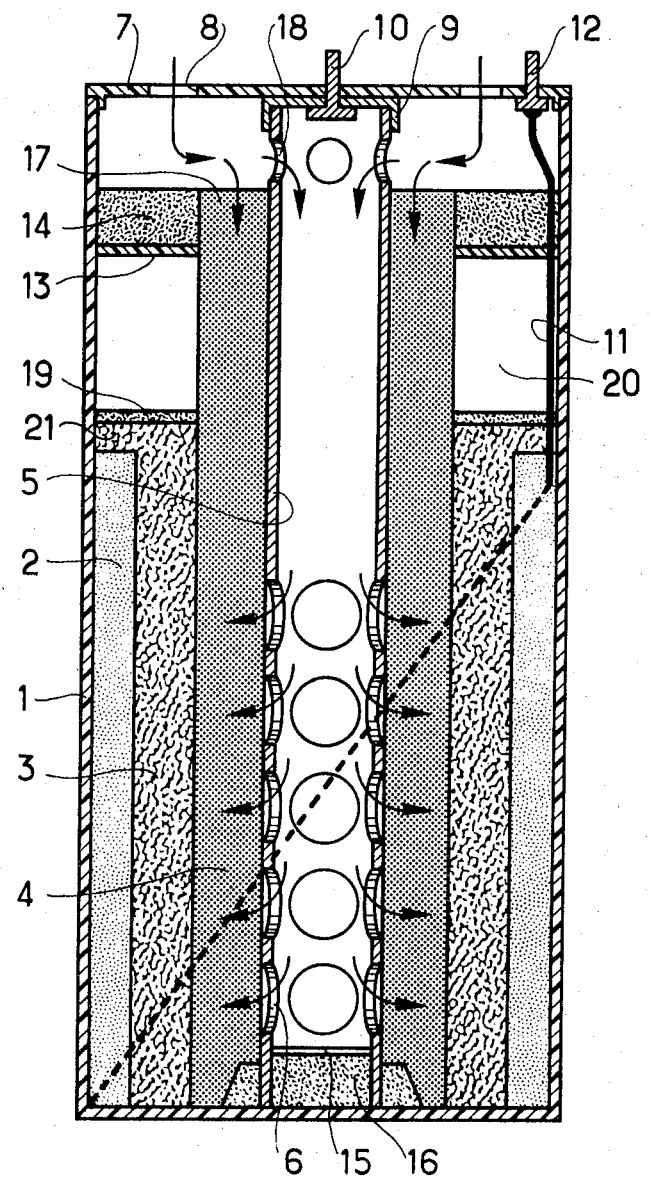

ALKALINE CELL WITH GELLED ELECTROLYTE AND RUPTURABLE MEANS

RELATED APPLICATIONS

No related applications in the name of the present applicant are copending.

BACKGROUND AND SUMMARY OF INVENTION

The invention relates to alkaline cells operating by oxygen depolarization, in which a layer of gelled electrolyte separates a negative electrode with a zinc base from a positive electrode supplied with oxygen or with air or other oxygen-containing gas. In cells of this type, the negative electrode comprises as a rule, a suspension of powdery zinc in an alkaline gel and increases in volume during cell discharge.

It is known in the art to provide free spaces inside the cell in order to permit this expansion. Nevertheless, the powdery zinc, for instance, in suspension in a gelled alkaline solution which constitutes the negative active material, is capable of expanding freely, and the swelling of this material is likely to result in a spacing apart of individual zinc grains which will insulate certain of those grains that are not yet fully discharged and will thereby prevent a part of the active materials from discharging. Moreover, if the free expansion space is in contact with outer air or gas containing oxygen, the zinc will be oxidized by the oxygen content of the gas during cell storage if the said active material is in direct contact with the said free space. Furthermore, the swelling active material is then likely to come in contact with the positive electrode.

In order to cope with these drawbacks, it has been proposed to place a layer of tar in direct contact with the negative material in order to separate it from the expansion space. However, if the tar layer is too thin, it will be ruptured during discharge, and one will again have to cope with the aforementioned drawbacks. If, on the contrary, it is too thick, the negative material will no longer be able to swell or expand into this space which is reserved for it and will exercise a pressure on the tar and unto the walls of the cell until the one or the other or both give way. As a matter of fact, the swelling of the powdery zinc is capable of reaching 60 percent by volume during the discharge of the negative electrode so that, in the case of cells having a substantial capacity, the resultant force of expansion is likely to be very high.

The instant invention serves to remedy these drawbacks in particular.

An object and feature of the invention is an alkaline electrolyte cell of the oxygen depolarization type in which a positive electrode supplied with oxygen or with oxygen-containing gas such as air is separated from a negative electrode having a powdery zinc base by a layer of gelled electrolyte, and which cell comprises a free internal expansion space, characterized by the fact that the said layer of gelled electrolyte is extended so as to separate the active material of the negative electrode from the said free space and in that the electrolyte of the cell is gelled by starches, the concentration of the starches lying between 150 and 240 grams per liter.

In this way, when air or other oxygen-containing gas penetrates into the expansion space, the electrolytic gel layer protects said active material from any contact with the gas and also controls the swelling of this material due to its mobility, a mobility which tar does not possess to the same extent, all the more so as the latter adheres to the walls of this cell. This is not the case with the use of gelled electrolyte.

However, the rigidity of the electrolytic gel should not be too great, otherwise one will again be faced with the drawbacks set forth above with regard to the tar layer.

The powdery negative active material preferably can be maintained in suspension in an alkaline gel of the same type as the electrolytic gel. Preferably, this alkaline gel should have a concentration of starches of the same order but slightly in excess of that of the electrolytic gel in order to achieve better results.

According to one preferred embodiment of the invention, the concentration in starches of the alkaline gel containing the negative active material in a state of suspension is in the range of about 180 to about 270 grams per liter.

It has been found that native starches yield stable gels with highly concentrated potassium hydroxide solutions of a normality in excess of 11N. However, when the attempt was made of using solutions having a lower potassium hydroxide concentration, for instance, for the use of cells in cold environments or for increasing the conductance of the electrolyte, it was found that the native starches produce gells that liquefy, which liquefaction is undesirable.

In order to remedy this drawback, according to another characteristic and feature of the invention, the starches serving for the gellifying of the electrolyte and also the alkaline gel containing the negative active material are comprised of reticulated or modified starches.

As a matter of fact, the reticulated or modified starches which are starches treated in known manner with certain products, such as epichlorohydrine resist far better than native starches the effect of potassium hydroxide solutions irrespective of the concentration of the latter. Therefore, these modified starches can be used with potassium hydroxide solutions of a normality below 11N without any liquefaction of the gels as would be the case with the same concentration of untreated or native starches. Examples of such modified or reticulated starches are described in the U.S. Pat. No. 2,748,183.

The detailed description that follows in conjunction with the accompanying drawing, presented as non-limitative examples, will provide a better understanding of the invention.

In the drawings, the single FIGURE depicts a vertical cross-section of a cell embodying the invention.

DETAILED DESCRIPTION

Referring to the drawing, reference character 1 depicts a plastic housing closed by a cover 7 of similar material fixed to said housing by any suitable means, as, for instance, by cementing.

Reference character 2 denotes the negative electrode having a zinc base. This negative electrode 2 can be prepared from a paste made up of finely divided, preferably amalgamated zinc particles having an amalgamating mercury percentage that may amount to about 1 percent by weight, and an alkaline gel in accordance with the invention and consisting of potassium hydroxide and starches. The anode 2 concentrically surrounds and is in direct contact with gelled electrolyte 3 which may either have the same composition as that of the alkaline gel of anode 2 referred to above or else may and preferably does contain a slightly lower amount of said starches.

By way of example, a suitable composition of the anode 2 and its negative active material is set forth:

For 500 grams of zinc powder:
approximately 28.5 grams of native starches and approximately 150 cc of 13.5N potassium hydroxide solution.

Thus, the alkaline gel content has a starch concentration of about 190 grams per liter.

The percentage of said starches in the electrolytic gel 3 amounts, for instance, to 150 grams per liter in the same concentration of potassium hydroxide solution.

If the potassium hydroxide solution has a normality of 7N, the native starch must be replaced by a treated or modified starch. As known in the art, the extent of the starch treatment or modification is governed by the following test:

5 grams of native starches with 100 cc of water are boiled for 20 minutes, and the processing degree is estimated in accordance with the volume of treated or resultant modified starches desposited after 24 hours.

In the case of a modified starch having a processing index of 47 (a volume of 47 cc of deposited modified starches), the concentration in the gelled electrolyte may be between 160 and 170 grams per liter, while the concentration in the potassium hydroxide solution of the alkaline gel of the anode 2 is made to amount to about 200 grams per liter.

In the case of a modified starch whose treatment has been advanced still further, having a processing index of approximately 32, its concentration in the electrolytic gel is about 200 grams per liter and the concentration thereof in the alkaline gel of anode 2 is about 225 grams per liter.

Reference character 4 denotes the air electrode. This electrode 4 may consist of a mixture of soot, carbon, manganese dioxide, and a plastic binding agent, such as a copolymer of ethylene and of vinyl acetate, Cover 7 is provided with openings 8 which permit entrance of air or other oxygen-containing gas into the cell.

The upper part of the positive electrode 4 is supplied with such gas via its extremity 17, which latter is in direct contact with the air or other oxygen-containing gas entering the cell via opening 8. In this upper part of the positive electrode 4, the diffusion therein of the gas occurs substantially parallel to the vertical axis of the cell.

Means also are provided in order that at least a part of the lateral area of the positive electrode 4 will also be in contact with the gas.

In the example shown, these means comprise a metal tube 5 which is coaxial with electrode 4 internally thereof. This tube 5 is provided at its upper extremity, which extends above the level of extremity 17 of said electrode, with openings 18 to allow the gas entering the cell via the openings 8 provided in the cover 7 to extend into the inside of the tube along its length. The tube 5 comprises toward its lower regions the openings or perforations 6, thus allowing the air or other gas to reach the lower portions of the positive electrode 4, and to achieve thereby an air or gas supply of this electrode in a direction that is substantially perpendicular to the axis of said tube. The metal tube 5, for instance, of steel, likewise constitutes the positive current collector of the cell. Its upper extremity is covered with a contacting metal cap 9, made, for instance of brass or steel.

Reference character 10 designates the positive terminal of the cell. This terminal is in electric connection with the cap 9. It may be made, for instance, of brass. Its outer end protrudes outwardly through cover 7.

The negative collector terminal of the cell comprises a metal wire 11, for instance, of copper, portions of which surround the electrode 2. The metal wire 11 is connected to a negative terminal 12, for instance, of brass which also protrudes outwardly of cover 7.

Means are provided at the lower extremity of the metal tube 5 to prevent the air or gas penetrating into the cell from coming into contact with the negative electrode 2. To that end, the lower extremity of the metal tube 5 is closed off by a washer 15 as of cardboard. The sealing tightness of the closing off washer 15 is improved by a deposit 16 of tar or similar sealing material applied and arranged inside a suitable cavity provided at the lower extremity of the positive electrode and also in the tube 5 below washer 15 prior to the introduction of these components into the cell housing 1. A washer 13, e.g., of cardboard is introduced with frictional tightness between the upper wall of cell housing 1 and the upper extremity 17 of the positive electrode but somewhat below the level of said extremity 17 and over which a layer 14 of tar or similar sealing material is applied.

In accordance with the invention, the upper extremity of the negative electrode (anode) 2 is covered with a layer 21 of said gelled electrolyte 3. The layer 21 is spaced from and defines in cooperation with the washer 13 and the upper portions of the positive electrode 4, an expanion chamber 20. This chamber is dimensioned so that preferably it has a volume that will be greater than the maximum increase in the volume of zinc containing negative electrode 2 during discharge of the cell. For the purpose of preventing the carbonation of the electrolyte, layer 21 is covered with and supports a thin layer 19 of tar or similar material.

During operation of the cell, the negative active material in electrode 2 expands and increases in volume uniformly along its entire height due to the distribution of the gas or air through the perforations 6 in the tube 5.

The layer 21 of the electrolytic gel 3 lends itself to this regular expansion by rising inside the expansion chamber 20 against initial resistance of the tar layer 19. This layer 19 is sufficiently thin so that it will rupture as a result of the expansion and thus be destroyed after having fulfilled its resisting function, serving thus to slow down the carbonation of the electrolytic gel 21 during cell storage. The electrolytic gel held back by said resistance, therefore, adds to the thickness of layer 21 which covers the upper part of the negative electrode 2, thereby increasing the protection of the upper surface of the negative electrode 2. The resistance of the layer 19 acting counter to the expansion of the negative material of said electrode suffices to preserve a favorable cohesion of the zinc particles therein that are more or less oxidized within this material. However, the mobility of the electrolytic gel 3 and layer 21 makes it possible for them to yield to the expansion forces of the said material.

In this manner, equilibrium is established of the forces generated by the expanding negative electrode 2 and the reaction exercised by the electrolytic gel 3.

By way of example, the shape and dimensions of a cell cross-sectionally as shown in the drawing are:

| | |
|---|---|
| The shape of the cell is that of a squaresectioned prism. | |
| Space requirement | 85 × 85 × 200 mm |
| Approximate weight | 1.8 kg. |
| Capacity | 360 Ah |
| Negative electrode with active material | |
| Externally | 80 × 8 × 115 mm |
| Internally | 65 × 65 × 115 mm |
| Positive electrode: Externally | 45 × 45 × 160 mm |
| Electrolytic gel: Overall elevation | 120 mm. |
| Thickness of the vertical section | 10 mm |
| Thickness of the layer 21 | 5 mm |
| Axial length of the expansion chamber 20 | 28 mm |
| The weight of the powdered zinc in the negative electrode is approximately 500 grams. | |

It is understood that the invention is in no way limited to the embodiments described and illustrated which are presented by way of example only. In particular, variations are possible and are contemplated without departing from the framework of the invention, and the scope of the appended claims, including modifications of details, changes in certain arrangements and or replace merits of certain means by equivalents.

What is claimed is:

1. An electrochemical cell of the oxygen depolarization type comprising a casing, a cover therefor, a tubular metallic member in said casing having perforations in its wall, a positive electrode about said member, said tubular metallic member extending for the full length of said positive electrode and outwardly of one end thereof, gelled alkaline electrolyte surrounding said positive electrode, a negative electrode which expands during discharge of the cell and being of less height than said positive electrode and comprising powdered zinc in alkaline gel surrounding said gelled alkaline electrolyte, a portion of said electrolyte overlying the uppermost end of said negative electrode, means for sealing off the lowermost end of said tubular member, sealing means spaced from said overlying portion of said electrolyte and defining an expansion space for the said negative electrode in said cell, the volume of said space being admeasured to accommodate the entire extent of expansion of said negative electrode during discharge of said cell, rupturable means in said cell to slow down carbonation of said electrolyte gel prior to use and during storage of said cell, and positive and negative terminals extending outwardly of said cell and connected electrically internally of said cell respectively with said positive and negative electrodes.

2. An electrochemical cell according to claim 1, wherein said gelled alkaline electrolyte comprises an alkali hydroxide solution with starch gelling agent whose concentration in said solution ranges from about 150 to 240 grams per liter.

3. An electrochemical cell according to claim 2, wherein said alkali hydroxide solution is potassium hydroxide having a normality ranging from approximately 7N to 13.5N.

4. An electrochemical cell according to claim 2 wherein said starch gelling agent is a native starch.

5. An electrochemical cell according to claim 2 wherein said gelling agent is treated starch, whose concentration in the alkali hydroxide solution ranges from about 160 to about 200 grams per liter.

6. An electrochemical cell according to claim 1, wherein the alkaline gel of said negative electrode comprises an alkali-hydroxide solution with starch gelling agent, said gelling agent having a concentration in said solution of from about 200 to about 225 grams per liter, and wherein said gelled alkaline electrolyte comprises an alkali-hydroxide solution with a starch gelling agent whose concentration in said last-named solution ranges from about 160 to about 200 grams per liter.

7. An electrochemical generator according to claim 6 wherein each said alkali-hydroxide solution has a normality ranging from about 7N to about 13.5N.

8. An electrochemical generator according to claim 1, wherein in said negative electrode, said powdered zinc in said alkaline gel thereof is present in the proportion of about 500 grams to about 28.5 grams of native starch gelling agent and about 150 cc of 13.5N potassium hydroxide solution, and wherein in said gelled electrolyte the percentage of native starch is about 150 grams per liter in about 150 cc of 13.5N potassium hydroxide solution.

9. An alkaline electrolyte cell of the air depolarization type including a positive electrode, means for providing access to said electrode of oxygen-containing gas, a negative electrode including powdered zinc in an alkaline gel, a gelled electrolyte interposed between the positive and negative electrodes, said cell having an expansion chamber to permit expansion of said negative electrode during discharge of said cell, said gelled electrolyte including a layer thereof serving to separate the negative electrode from said chamber, rupturable means above said layer and sealing means spaced from said rupturable means and defining said chamber and said gelled electrolyte comprising starches whose content is in the range of about 150 to 240 grams per liter.

10. Alkaline electrolyte cell of the oxygen-depolarization type in which a positive electrode supplied with oxygen or air is separated from a powdery zinc base negative electrode by a layer of gelled electrolyte, said cell having an expansion chamber, said gelled electrolyte comprising a layer extending over said negative electrode so as to separate the negative active material from the said chamber, the said electrolyte being gelled by starches, said starches in content being in the range of a concentration of about 150 to 240 grams per liter, rupturable means covering said layer and sealing means spaced from said rupturable means and with the latter means defining said expansion chamber.

11. Cell according to claim 10, characterized by the fact that the negative electrode comprises a zinc powder and an alkaline gel.

12. Cell according to claim 11, characterized by the fact that the alkaline gel containing the zinc powder is gelled by starches, the concentration in starches therein being between 180 and 270 grams per liter.

13. Cell according to claim 10 characterized by the fact that said starches are of a reticulated or modified structure.

14. Cell according to claim 10, characterized by the fact that said electrolyte is constituted by a solution of potassium hydroxide having a normality below 11N.

15. An electrochemical cell according to claim 1, wherein said positive electrode, said gelled electrolyte and said negative electrode are concentrically disposed about said tubular member, said tubular member at one end extending outwardly of positive electrode, said positive electrode being greater in length than said gelled electrolyte and said negative electrode, said expansion space being annular and being located between said cover and said portion of said electrolyte overlying said end of said negative electrode, said sealing means defining said expansion space and comprising a washer within said casing spaced from said rupturable means overlying said portion of said gelled electrolyte, sealing material on said washer, said cover having perforations to admit oxygen-containing gas to said cell, and said tubular member also having additional perforations to admit gas entering said cell through the perforations in said cover and to direct said gas toward said first-named perforations in said tubular member for diffuse delivery of said gas to the positive electrode in substantially perpendicular direction to the vertical axis of said cell.

* * * * *